United States Patent [19]

Kojima et al.

[11] Patent Number: 4,885,678
[45] Date of Patent: Dec. 5, 1989

[54] VECTOR PROCESSOR FOR PROCESSING DATABASE WITHOUT SPECIAL TAGS FOR VECTOR ELEMENTS

[75] Inventors: Keiji Kojima, Kodaira; Shunichi Torii, Musashino; Akiharu Sakata, Kokubunji, all of Japan

[73] Assignee: Hitachi, Ltd., Tokyo, Japan

[21] Appl. No.: 124,923

[22] Filed: Nov. 24, 1987

[30] Foreign Application Priority Data

Nov. 28, 1986 [JP] Japan .................................. 61-281719

[51] Int. Cl.⁴ .......................................... G06F 15/347
[52] U.S. Cl. ................................ 364/200; 364/232.21
[58] Field of Search ..................... 364/200, 900, 300

[56] References Cited

U.S. PATENT DOCUMENTS 4,620,275 10/1986 Wallach et al. ..................... 364/200

Primary Examiner—Raulfe B. Zache
Attorney, Agent, or Firm—Kenyon & Kenyon

[57] ABSTRACT

A vector processor includes a memory for storing vector data, a processing circuit, a fetch circuit for sequentially fetching elements of a first vector data to be processed from the memory and supplying them to the processing circuit, a generation circuit for generating tag information to designate the fetched vector elements, and a write circuit responsive to the process result by the processing means for writing the tag information generated for the element having a predetermined process result into the memory as one element of a second vector data.

7 Claims, 8 Drawing Sheets

FIG. 6

| ITEM | JOIN | CMP | UPX | UPY | UPZ | SREQ | |
|---|---|---|---|---|---|---|---|
| 1 | — | = | — | — | — | — | FOR JOIN INSTRUCTION AND ODX = ODY |
| 2 | — | > | O | — | O | O | FOR JOIN INSTRUCTION AND ODX > ODY |
| 3 | — | < | — | O | O | O | FOR JOIN INSTRUCTION AND ODX < ODY |
| 4 | O | DON'T CARE | — | — | — | — | FOR EXECUTION OF LIST MOVE INSTRUCTION |

VECTOR PROCESSOR FOR PROCESSING DATABASE WITHOUT SPECIAL TAGS FOR VECTOR ELEMENTS

BACKGROUND OF THE INVENTION

The present invention relates to a vector processor, and more particularly to a vector processor suitable for join process for a relational data base.

FIG. 7A illustrates a join process in a relational data base. In FIG. 7A, data in a part name table 701 and a price table 702 which have the same part number are joined in one line to prepare a join table 703.

In a normal relational data base, each line (record) of each table is not recorded in a continuous area of one storage (for example, magnetic disk) but is recorded dispersedly in many areas. Accordingly, a long time is required to read various required data of tables in the join process.

The data base stores indexes 707 and 708 for tables 701 and 702. The indexes store record numbers of lines (records) of the tables. When a record number is given, a corresponding record in the table can be read. The indexes 707 and 708 are not stored as a table in the data base although they are shown in a form of table. Since the indexes are also in the magnetic disk, a long time is required to read them.

In the prior art, the join process is normally performed by scalar processing by a scalar processor. Thus, after readout of an element in a table from the storage and processing thereof, the next element is processed. As a result, the join process requires a long time. As an approach to resolve this problem, U.S. Pat. No. 4,644,471 assigned to the assignee of the present invention discloses a method for translating tables of a relational data base to vectors. EU-A-149213 or corresponding U.S. Patent application Ser. 685,116 assigned to the assignee of the present invention discloses a vector processor for processing such vectors at a high speed. In the latter vector processor, each vector operand is independently controlled and a data format of a vector element is expanded to enable vectorization of a merge operation which is frequently used in the relational data base processing.

As shown in FIG. 7B, two vectors 704 and 705 are stored in a main memory as information equivalent to information of the tables shown in FIG. 7A, and those vectors are processed to write one vector 706 into the main memory. The term vector means data stored to be continuously read from the memory. Specifically, it means data stored at constantly displaced memory locations of the main memory. Each vector element comprises two fields (four-byte length each) called a front field (for example 704A) and a rear field (for example 704B). The rear field 704B of each element of the first input vector 704 comprises one of part numbers $P_2$, $P_3$, $P_8$ and $P_9$ of one of part name tables 701, and the front field 704A comprises corresponding one of record numbers $\alpha$, $\beta$, $\gamma$ and $\delta$ of the indexes 707. Similarly, the second input vector 705 contains information of a price table 702 and the indexes 708. The elements of the two input vectors 704 and 705 are sequentially compared by an operation unit starting from the leading ones, and vectors having elements which are pair of record numbers in the front fields of two elements having the same rear field content, for example, $(\alpha_1, \alpha_2,)$ and $(\gamma_1, \delta_2)$, of the elements of the input vectors 704 and 705 are outputted as an operation result output vector 706 (step 707). The records corresponding to the pair of record numbers in the output vector 706 are read from the tables 1 and 2 (FIG. 7A) to prepare the join table 703 of FIG. 7A (step 708).

In the above prior art system, it is necessary to previously store in the front fields 704A and 705A tags to identify lines of tables at which the part numbers stored in the rear fields 704B and 705B of the input vectors 704 and 705 have been stored in order to derive the join table 703 from the output vector 706. As a result, a long process time is required. Since many tables are used in the relational data base, when they are to be stored in the main memory as vectors, a time required to store the front fields raises a serious problem.

Further, since each vector requires the front field, the amount of data of each vector increases and a larger area in the main memory is occupied by the vectors. Since many tables are used in the relational data base, when they are vectorized, the memory area of the main memory occupied by the front fields of the vectors materially increases.

SUMMARY OF THE INVENTION

It is an object of the present invention to provide a vector processor which does not need to add tag information and has a high processing efficiency.

The above object is achieved by providing means for generating information which enables identification of each vector element in a vector operand such as vector element numbers in an operation unit or main memory addresses of vector elements and storing such information in the main memory as tags for the operation result.

A part number of a part name table 701 is stored in a first input operand X and a part number of a price table 702 is stored in a second input operand Y, and the element of X and the element of Y are compared. If both elements are equal, a pair of operand counters of the input operands are generated as tag information to identify both elements and they are outputted as elements of a third output operand Z. The operands X and Y and the counters i and j are initially "1" and the comparison of X(1) and Y(1) is equal (P2=P2). Accordingly, the pair (i, j) or (1, 1) is stored as Z(1). Then, the operand counters i and j are incremented by one and X(2) and Y(2) are compared. Since they are not equal (P3<P5), the pair (2, 2) is not stored and only the smaller operand counter i is incremented by one, and similar operation is repeated. When the operand counters i and j are 3 and 4, respectively, they are gain equal (P8=P8) and the pair (3, 4) is stored as (Z2).

The output vector Z shows the lines of two tables to be joined which have the same part number. A join table may be prepared based on the vector Z. Since the tag information for identifying the line is derived from the operand counter which indicates the progress status of the vector operation, there is no need to previously add the tag information to the vectors X and Y.

BRIEF DESCRIPTION OF THE DRAWINGS

FIG. 6 shows a truth table of a join control logic of an embodiment of the present invention.

DETAILED DESCRIPTION

Configuration and operation of one embodiment of a vector processor of the present invention are explained with reference to FIG. 1.

Figure 1:
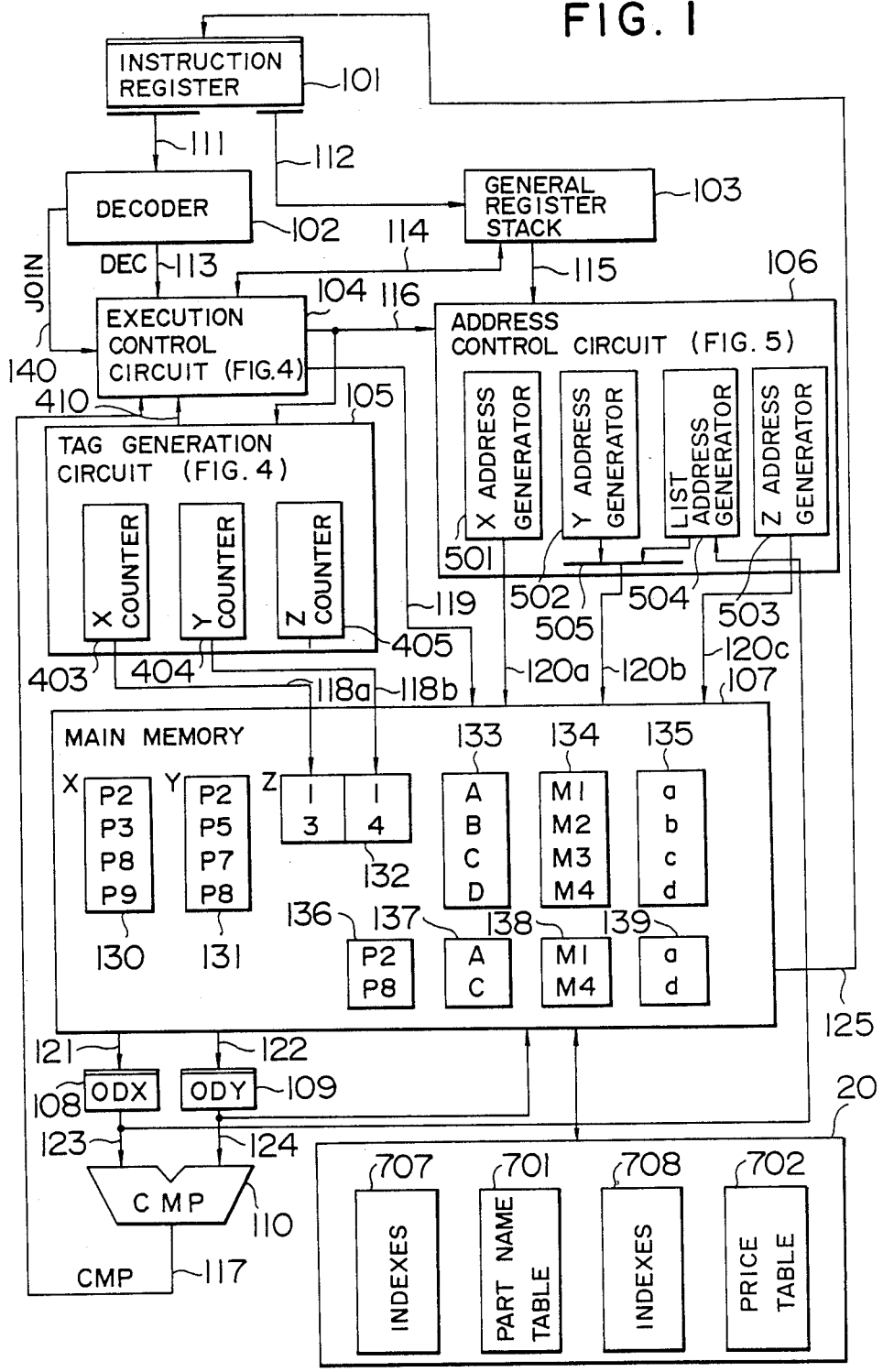
FIG. 1 shows an overall configuration of one embodiment of a vector processor of the present invention.

In FIG. 1, numeral 107 denotes a main memory, numeral 101 denotes an instruction register which holds an instruction fetched from the main memory 107, numeral 102 denotes an instruction decoder, numeral 103 denotes a general register stack, numeral 104 denotes an execution control circuit which controls the execution of the decoded instruction, numeral 106 denotes an address control circuit which controls the generation of an address to access the main memory 107, numeral 105 denotes a tag generation circuit which generates tag information to be stored as execution result, and numeral 110 denotes a comparator for comparing a pair of vector elements read from the main memory 107.

The main memory 107 stores various data tables of a relational data base as vectors. For example, numeral 130 denotes a vector having all part numbers P2, P3, ---- of the part table 701 shown in FIG. 7A as its elements. Numeral 131 denotes a vector having all part numbers P2, P5, ---- of the price table 702 shown in FIG. 7A as its elements. Numeral 133 denotes a vector having all part names, A, B, ---- of the part table 701 as its vectors. Numerals 134 and 135 denote vectors having manufacturer's names and unit prices of the price table 702 as their elements, respectively.

Figure 7A:
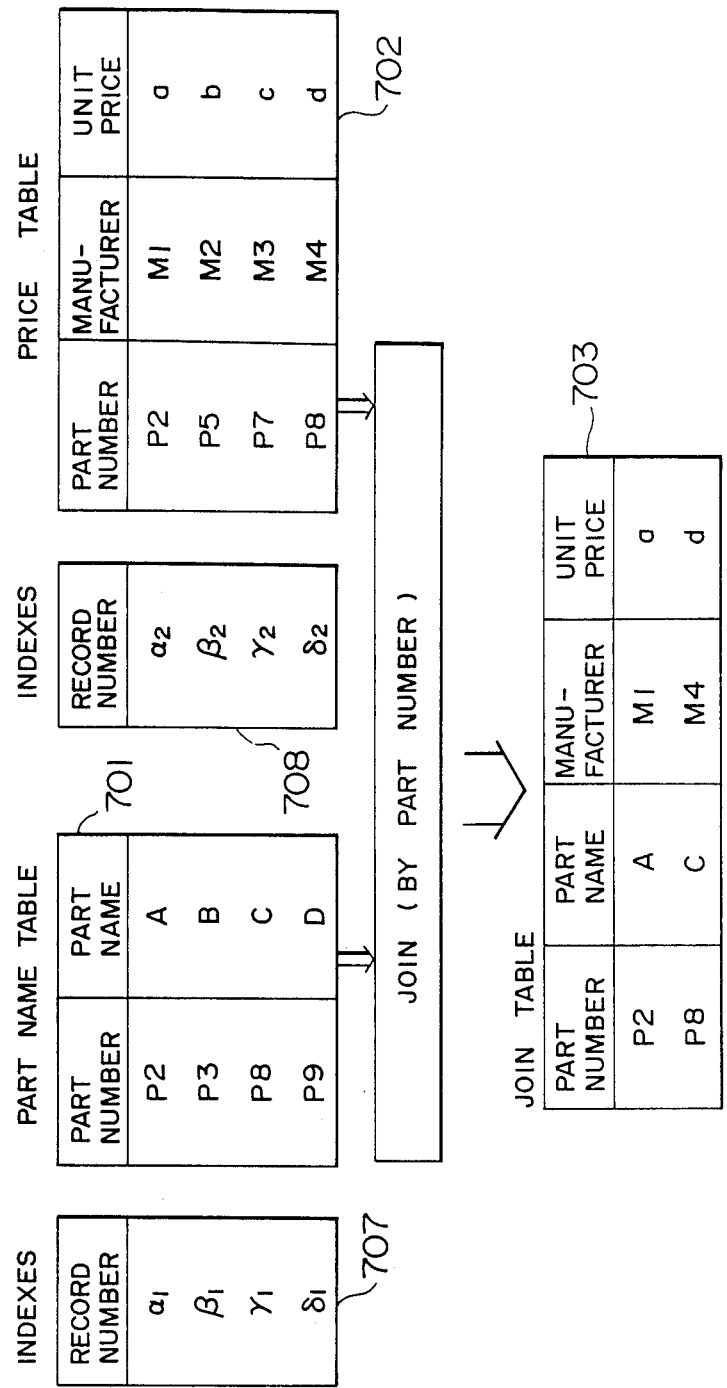
FIG. 7A illustrates join process of a relational data base.
Figure 7B:
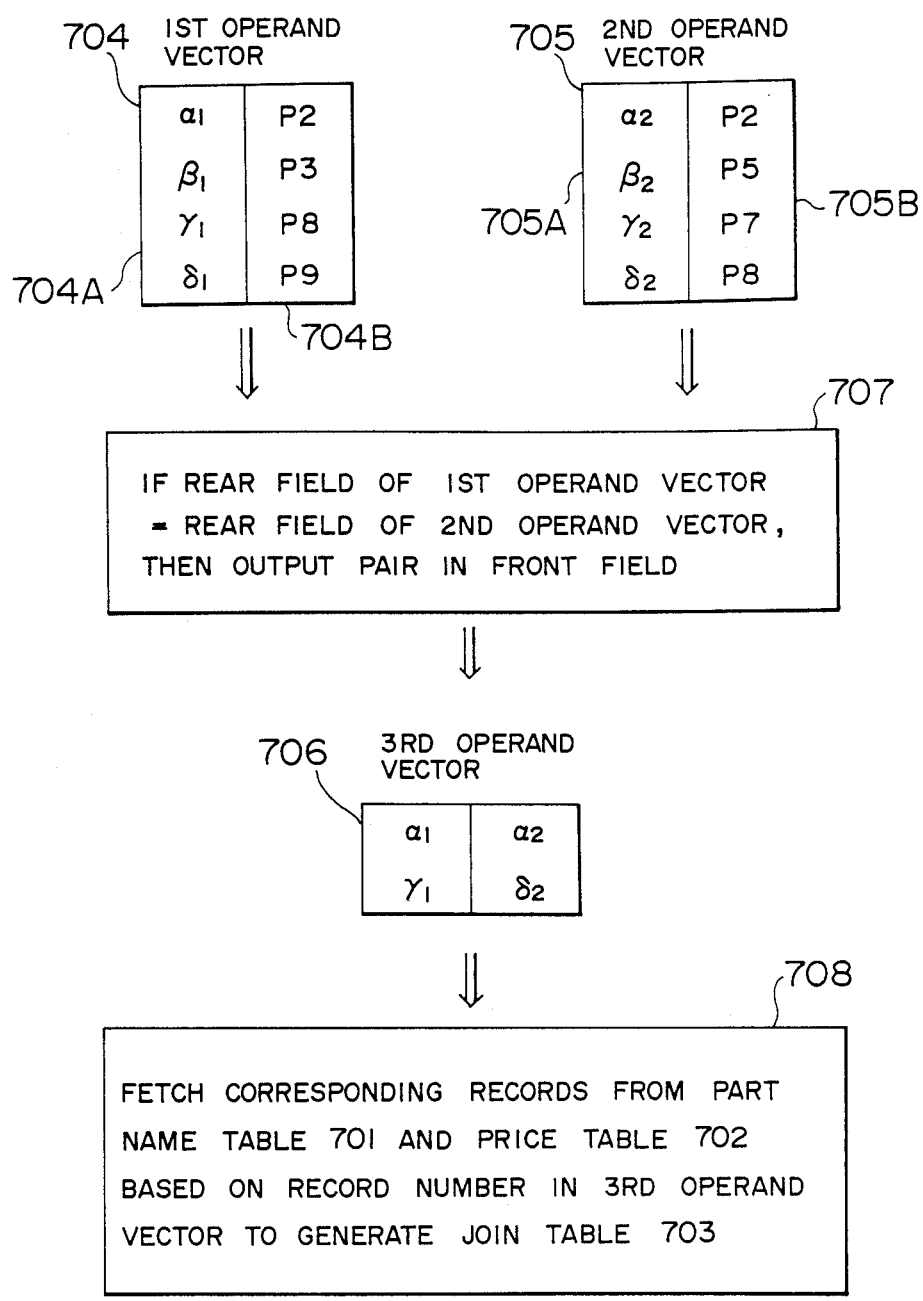
FIG. 7B illustrates prior art join process by vector processing.

The part name table 701 shown in FIG. 7A, the indexes 707 thereof, the price table 702 and the indexes 708 thereof are stored in a magnetic disk 20, and those vectors are generated by using those tables and indexes by a method disclosed in U.S. Pat. No. 4,644,471. For example, the vector 130 is generated in the following manner. Record (memory location) numbers in the magnetic disk 20 in which the elements in the part table 701, that is, pairs of part numbers and part names, are stored in the indexes 707 to the part table 701. One of the indexes 707 is read, a part number is read from the record position designated by the index and it is written into a leading element position of the vector 130 in the main memory 107. A similar process is repeated for each of the indexes to form the vector 130. Other vectors 131 and 133-135 are similarly generated.

In the present embodiment, the front fields (704A, 705A, 705B) shown in FIG. 7A are not added to the vectors 130 and 131. As will be explained later, in the present embodiment, the vectors 130 and 131 are joined and the i-th element of the vector 130 is compared with the j-th element of the vector 131, and if they are equal, a vector 132 having the pair of the element number i in the vector 130 and the element number j in the vector 131 as the elements is written into the main memory 107. For example, for the vectors 130 and 131 of FIG. 1, the first element of the vector 130 and the first element of the vector 131 are equal and hence the first element of the vector 132 has values (1, 1). Similarly, since the third element of the vector 130 and the fourth element of the vector 131 are equal, the second element of the vector 132 has values (3, 4). The vectors 130 and 133 are accessed by using a vector consisting of the element number sequence (1, 3) of a front half of the vector 132 so that a vector 136 consisting of vector elements P2 and P8 of the vector 130 and a vector 137 consisting of vector elements A and C of the vector 133 are written into the main memory 107. Similarly, the vector 134 is accessed by using a vector consisting of the element number sequence (1, 4) in a rear half of the vector 132 so that vectors 138 and 139 consisting of some of the elements of the respective vectors are written into the main memory 107.

It is apparent from the result table 703 of FIG. 7A that the vectors 136–139 thus generated represent the join result.

Thus, in the present embodiment, the join process can be executed by vector processing without using the indexes as the tags. When the tags are used, it is necessary to sequentially read the indexes from the magnetic disk 20 and store them into the main memory 107 as portions of elements of the vector. Since those indexes are not stored in continuous areas of the magnetic disk 20, the time required to read the indexes and store them into the main memory is a factor to reduce a processing speed of the relational data base. The relational data base includes many tables, and when they are vectorized and stored in the main memory 107, the above process time raise a practical problem. When the corresponding index to the table is stored in the main memory as the tag for the vector as was done in the prior art, a portion of the main memory is occupied by the tags. In the relational data base which handles many tables, a large area of the main memory is used for many tags and a freely usable area in the main memory is materially limited. In the present embodiment, since no tag is needed as a portion of the vector in the join process, the above problem is eliminated.

Prior to a detailed description of the vector processor shown in FIG. 1, an instruction format of the vector instruction in the present embodiment is explained with reference to FIG. 2, which shows a 32-bit vector instruction. High order 16 bits of the instruction indicate a type of instruction. A field R1 202 contains a 4-bit binary integer which designates a general register 207 having the number specified by the field R1 and two consequentive general registers 208 and 209, of sixteen general registers 0–15. Similarly, a field R2 designates a general register 204 having the number equal to the content of the field R2 and consecutive general registers 205 and 206.

The general registers 204–206 designate start addresses of first operand vector X (403), second operand vector Y (404) and third operand vector Z (405). The general registers 207–209 designate numbers of vector elements of the first to third operands. The start addresses of the vectors X, Y and Z are set into the general registers 204–206. Since the numbers of elements of the vectors X and Y are four, "4" is set into the general registers 207 and 208. In the merge join operation, since the number of elements of the output vector Z is not predictable (the number of equal elements is not predictable) before operation, an appropriate number is set in the general register 209. For example, if "5" is set into the general register 209, the instruction terminates when the number of elements of the output vector Z exceeds "4". (In the present embodiment, since the output consists of only two elements, it is sufficient if "2" is set in the register 209).

The operation of the embodiment of FIG. 1 is now explained.

The vector instruction stored in the main memory 107 is fetched to the instruction register 101 through a data path 125 and decoded by the decoder 102. As the type of instruction is determined by decoding, it is informed to the execution control circuit 104 by the control signals 113 and 140 and the control is started depending on the type of instruction. In parallel thereto, the content of the general register of the general register stack 103 which is designated by the instruction is sent to the execution control circuit 140 and the address control circuit 106 through the data paths 114 and 115 and set up therein. In this manner, those circuits are initialized.

After the initialization, the execution control circuit 104 sends a fetch request signal and a store request signal for the operand vector elements to the main memory 107 through the control line 119. In parallel thereto, update commands to the fetch address and the store address are sent to the address control circuit 106 from the execution control circuit 104 through the control signal line 116. When the main memory 107 receives the fetch request, it reads out the vector elements of the vector X(130) and the vector Y(131) in accordance with the fetch addresses supplied from the address control circuit 106 which generates the request addresses of the vector operands, through the data path 120. The fetched vector elements are set into the operand data registers ODX 108 and ODY 109 through the data paths 121 and 122. The data set in the registers 108 and 109 are compared by the comparator 110 and the comparison result is sent to the execution control circuit 104 by the signal 117. When the comparison result shows equality, the execution control circuit 104 reads the element numbers of the vectors 130 and 131 from the X counter 403 and Y counter 404 of the tag generation circuit 105 and sends them to the main memory 107 through the data path 118 and stores them therein.

A feature of the present invention resides in that the element numbers in the operand counters 403 and 404 are generated by the tag generation circuit 105 as the tag information to identify the vector elements which resulted in a particular comparison result. Accordingly, it is not necessary to add the tag information to the vector elements as is done in the prior art.

The start addresses and the numbers of vector elements of the vector operands are stored in the general register stack 103. If the content of the counter 403, 404 or 405 of the tag generation circuit 105 exceeds the number of vector elements stored in the general register, the execution control circuit 104 stops to send the fetch request and store request and the execution is terminated. Then, the next instruction is fetched from the main memory 107 and set in the instruction register 101.

Detailed operation of the vector processor shown in FIG. 1 is now explained. Specifically, a flow of a time chart of FIG. 3 which illustrates a progress of the process is explained with reference to configurations of the related logic circuits (FIGS. 4–6).

Figure 3:
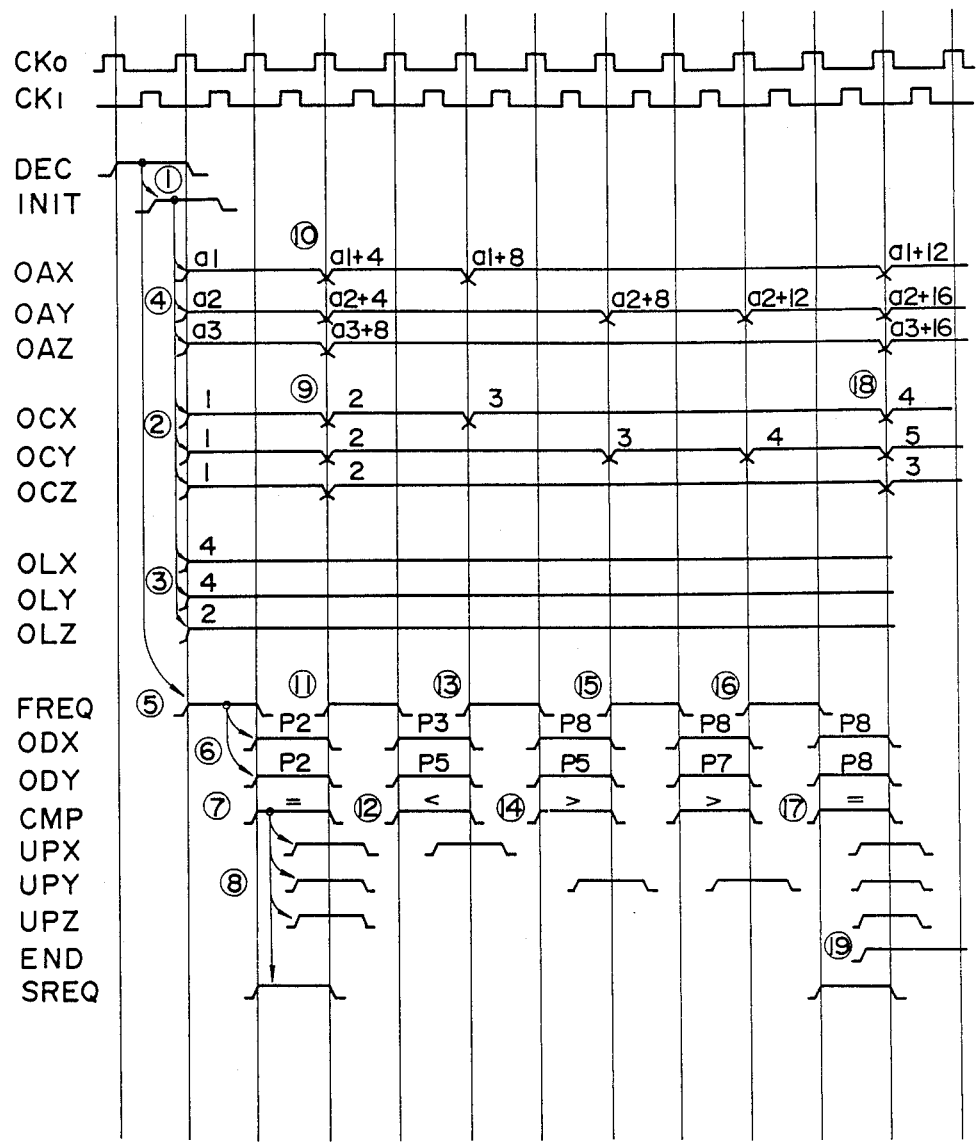
FIG. 3 shows a time chart of an operation of an embodiment of the present invention.

FIG. 3 shows the time chart of the operation of the vector processor of FIG. 1. The present vector processor uses a two-phase ($CK_0$ and $CK_1$) clock signal for synchronization.

Figure 2:
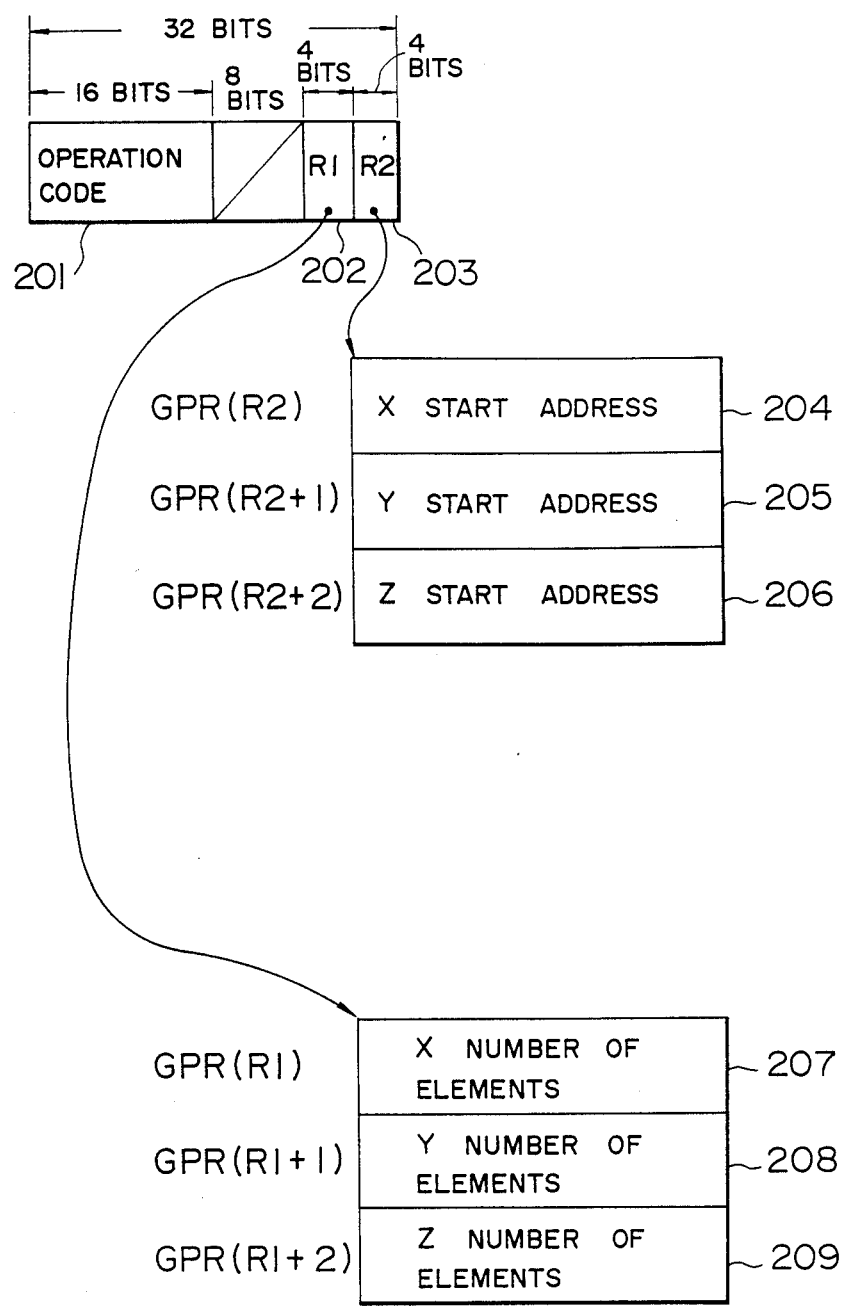
FIG. 2 shows an instruction format in an embodiment of the present invention.

When the vector instruction of the format shown in FIG. 2, fetched to the instruction register 101 is decoded as a merge/join instruction, control signals DEC 113 and JOIN 140 are sent to the execution control circuit 104.

Figure 4:
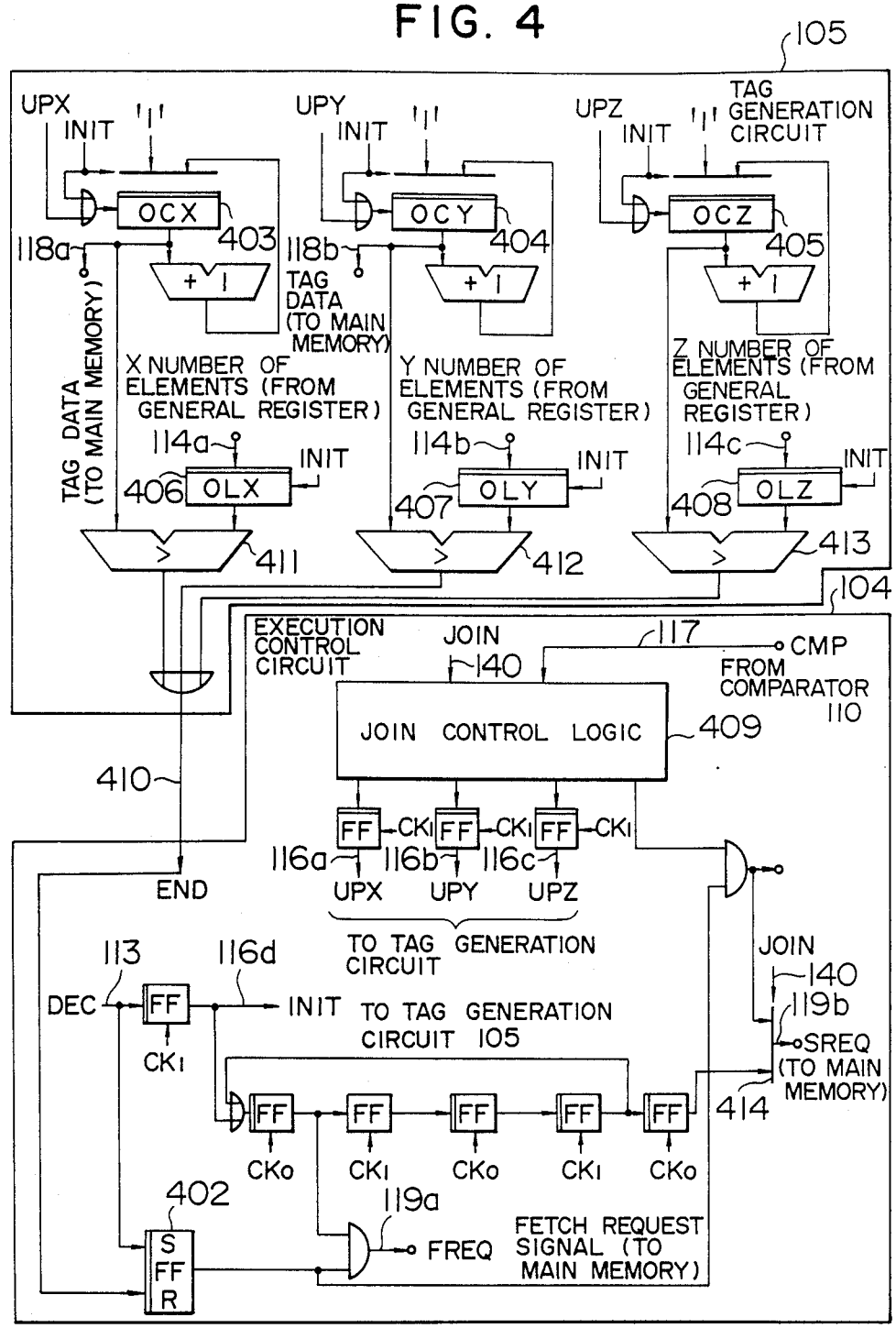
FIG. 4 shows a configuration of an operation control circuit and a tag generation circuit in an embodiment of the present invention.
Figure 5:
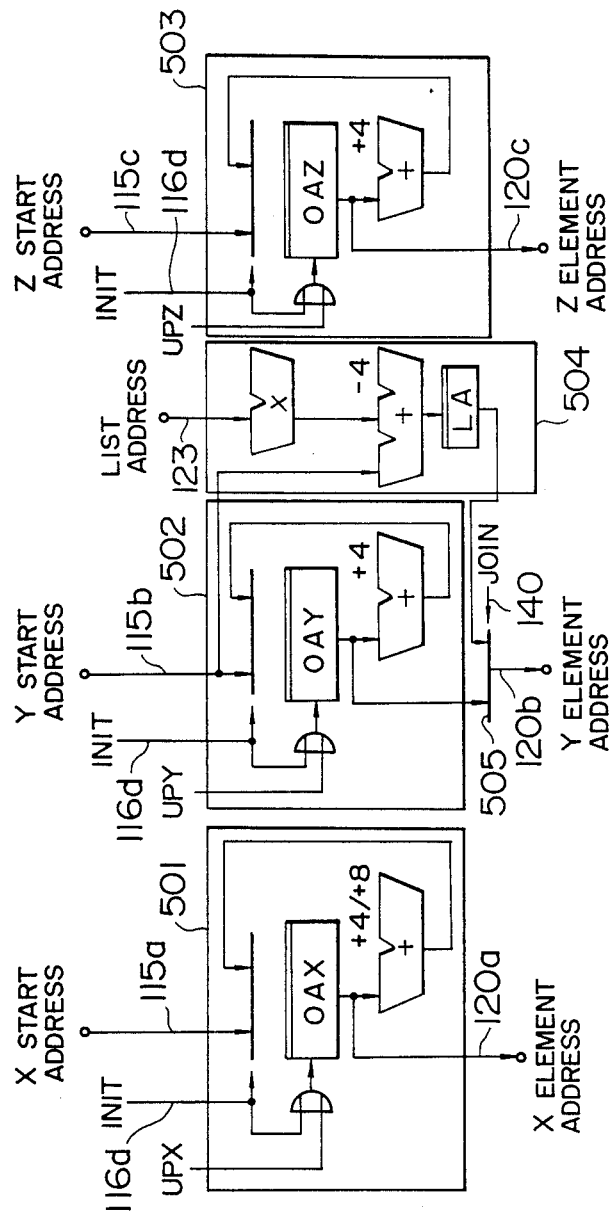
FIG. 5 shows a configuration of an address control circuit in an embodiment of the present invention.

FIG. 4 shows a configuration of the execution control circuit 104. The execution control circuit 104 receives the DEC signal from the decoder 102 and generates a control signal INIT 116d to command the initialization of the circuits (FIG. 3 ①). To this end, a hold-type flip-flop 402 is set in response to the DEC signal. Counters OCX 403, OCY 404 and OCZ 405 are operand counters which indicate the element numbers in the tag generation circuit 105, of the vectors X, Y and Z. Initial values "1" are set in the operand counters OCX 403, OCY 404 and OCZ 405 in response to the INIT signal (FIG. 3 ②).

The numbers of elements of the first, second and third operands stored in the general registers 207, 208 and 209 are set in the element count registers OLX 406, OLY 407 and OLZ 408 of the execution control circuit 104 in response to the INIT signal (FIG. 3 ③).

The INIT signal 116d from the execution control circuit 104 is also sent to the address control circuit 105 to initialize it.

FIG. 5 shows a configuration of the address control circuit 106. The start addresses (a1, a2 and a3) of the first, second and third operands stored in the general registers 204, 205 and 206 are set in the address registers OAX 501, OAY 502 and OAZ 503 in response to the INIT signal (FIG. 3 ④). Thus, the address control circuit 106 has been initialized.

One clock after the DEC signal 113, the fetch request signal FREQ 119a is sent from the execution control circuit 104 to the main memory 107 (FIG. 3 ⑤). Thereafter, the FREQ signal is issued at every other clock until the execution is terminated.

When the main memory 107 receives the fetch request, it reads data by using the contents of the address registers OAX and OAY sent through the data paths 120a and 120b as fetch addresses, and sends them to the fetch registers ODX 108 and ODY 109. Since the address registers OAX and OAY have been initialized to the start addresses of the first operand vector X and the second operand vector Y of FIG. 1, "P2" is provided to the fetch data registers 108 and 109 (FIG. 3 ⑥). The contents of the fetch data registers ODX and ODY are compared by an operation unit 110, which sends a comparison result signal CMP 117 to the execution control circuit 104. In the present embodiment, the equality of the contents of ODX and ODY is informed (FIG. 3 ⑦).

The CMP signal is applied to a join control logic 409 of the execution control circuit 104.

FIG. 6 shows a truth table of the operation of the join control logic 409. When the JOIN signal 140 is "1" and the CMP signal indicates that ODX and ODY are equal (FIG. 6, item 1), the update signals UPX 116a, UPY 116b and UPZ 116c and the store request signal SREQ 119 for the operand counters OCX, OCY and OCZ and the operand addresses OAX, OAY and OAZ are "1". When the CMP signal indicates that ODX is larger than ODY (FIG. 6, item 2), only the UPY signal is "1" so that only the operand counter OCY and the operand address OAY of the second operand are updated. When the CMP signal indicates that ODX is smaller than ODY (FIG. 6, item 3), only the UPX signal is "1" so that only the operand counter OCX and the operand address OAX of the first operand are updated.

Since the current CMP signal (FIG. 3, ⑦) indicates that ODX and ODY are equal, that is, the join condition is met, UPX, UPY, UPZ and SREQ are set to "1" (FIG. 3, ⑧).

When the main memory 107 receives the store request signal SREQ 119b, the contents of the operand counter OCX and OCY are sent to the main memory 107 as store data through the data path 118 and they are stored at a location designated by the store address register OAZ.

On the other hand, the operand counters OCX, OCY and OCZ are incremented by one by the signals UPX, UPY and UPZ so that they have values "2" (FIG. 3, ⑨). The operand addresses OAX, OAY and OAZ are also updated to designate the next elements (FIG. 3, ⑩).

As the operand counters and operand addresses are renewed, a second fetch request signal FREQ is sent (FIG. 3, ⑪). The subsequent process is similar to that for the first FREQ (FIG. 3, ⑤). Since the comparison result signal CMP now indicates P3<P5 (FIG. 3, ⑫), only the UPX signal is "1" (FIG. 6, item 3) and OCX and OAX are updated to "3" and "a1+8", respectively, and the store request signal SREQ is not issued. For a third FREQ (FIG. 3, ⑬), the comparison result is P8>P5 (FIG. 3, ⑭) and only the UPY signal is "1" (FIG. 6, item 2) so that OCY and OAY are updated to "3" and "a2+8), respectively. For a fourth FREQ (FIG. 3, ⑮), third elements of the vectors X and Y are fetched as shown by OCX and OCY. The fetched data have a relation of P8>P7 and hence the same operation as the previous one (FIG. 6, case 2) is repeated. For a fifth FREQ (FIG. 3, ⑯), the fetched data are both P8 (FIG. 3, ⑰) and the signals UPX, UPY, UPZ and SREQ are "1" as they are for the first FREQ, so that the operand counters and address registers are updated, and the contents of OCX and OCY, that is, (3, 4) are written into the main memory 107. The operand counters OCX, OCY and OCZ are incremented by one to "4", "5" and "3", respectively (FIG. 3, ⑱). The comparison of the contents of OCY and OLY indicates 4>3. This means that the content of the counter exceeds the number of elements. Thus, the control signal END 410 which indicates the termination of execution is set to "1" (FIG. 3, ⑲), a flip-flop 402 which indicates that the join instruction is under execution is reset, the fetch request FREQ and store request SREQ are stopped and the execution of the join instruction is terminated.

After the join instruction has been executed, the vector Z is written in the main memory 107 as the third operand vector of the instruction. The elements of the vector Z indicate those lines of the part name table 701 and the price table 702 which have equal part numbers. Accordingly, the join table is prepared by joining the lines designated by the pairs of values stored in the elements of the vector Z, that is, the first line of the table 701 and the first line of the table 702, and the third line of the table 701 and the fourth line of the table 702.

In the present embodiment, instead of the join table, the vectors 136–139 consisting of the elements of the table are prepared in the following manner based on the part name vector 133 prepared from the table 701 and the manufacturer vector 134 and price vector 135 prepared from the table 702. The vectors 136–139 are collectively called as join result vectors.

The join result vectors may be efficiently prepared by a list vector move instruction which is a known vector processing instruction in a vector processor contained in Hitachi M-680H. The list vector move instruction has an instruction format shown in FIG. 2, and it instructs an operation of $Z(i) \leftarrow Y(X(i))$ (i=1−N, where N is the number of vector elements) for the first to third operand vectors X, Y and Z.

In the present embodiment, when the decoder 102 decodes the list vector move instruction, it sends the control signal DEC 113 to the execution control circuit 104 as it does for the join instruction, and the INIT signal 116d is sent so that the counters 403, 404 and 405, the vector element count registers 406, 407 and 408, and the address generators 501 and 503 are initialized. The flip-flop 402 is also set. One clock after the DEC signal, the fetch request signal FREQ 119a starts to be sent. When the decoder 102 decodes the list vector move instruction, it sets the join signal 140 to "0". Accordingly, four clocks after the DEC signal, the store request signal SREQ 119b starts to be sent through the selector 414.

One clock after the main memory 107 has received the FREQ signal and the first operand element address 120a from the X address generator 501, it sends the first operand element X(i) to the list address generator 504 of the address control circuit 106 through the path 123. The list address generator 504 multiplies the element number stored in X(i) by four and adds the product to the start address of the second operand vector Y to generate the address of the second operand vector element Y(X(i)), and sends it to the main memory 107 through the selector 505 and the path 120b.

One clock after the main memory 107 has received the address 120b Y(X(i)) and the FREQ signal 119a, it reads out the second operand element Y(X(i)) and sets it into the register 109. The data set in the register 109 is stored at a position designated by the third operand element address 120c supplied from the Z address generator 503, as the third operand vector element Z(i), in accordance with the store request signal SREQ 119b.

Since the JOIN signal is "0", the join control logic 409 carries out the operation of the item 4, that is, the counters 403, 404 and 405 and the operand addresses 120a and 120c are updated and the list vector move process is continued.

When the content of the counter 403, 404 or 405 exceeds the content of the corresponding vector element count register 406, 407 or 408, the END signal 410 is set to "1" as it is done for the join instruction, the flip-flop 402 is reset, the send-out of the FREQ signal 119a and the SREQ signal 119b is stopped, and the execution of the list vector move instruction is terminated.

The join table is prepared by using the list vector move instruction in the following manner.

A front half of the vector 132 is used as the first operand vector, and the vector 130 is used as the second operand vector, and the vector 136 is generated by the list vector move instruction. Similarly, a front half of the vector 132 is used as the first operand vector and the vector 133 of the content of the part name column of the part name table is used as the second operand vector, and the vector 137 is generated by the list vector move instruction. Then, a rear half of the vector 132 is used as a first operand and the vectors 131, 134 and 135 are moved by the list vector move instruction to generate the vectors 138 and 139. The vectors 136, 137, 138 and 139 are desired join result vectors.

In accordance with the present invention, in the operation which requires to identify the attribute of the vector elements which resulted in a particular result (such as matching of the elements in the merge/ join operation), for example, the element numbers in the operand vector, the tag information for the identification is generated in the execution circuit. Accordingly, it is not necessary to add special tag information to the vector elements, and the process time to add the tag information and a memory, area therefor are saved. The result can be used as the list vectors to generate the result vectors.

We claim:

1. A vector processor comprising:
   a memory for storing vector data;
   first means, connected to said memory, for sequentially fetching elements of a first vector data to be processed, for said memory;
   second means, connected to said first means, for processing elements fetched by said first means;
   third, means for generating plural tag information, each such tag information designating a corresponding one of the fetched vector elements in synchronism with the fetching; and
   fourth means, connected to said first, second, and third means, for writing the information generated by said third means for one of the fetched elements into said memory as an element of a second vector data in response to a predetermined process result obtained by said third means for said one fetched element.

2. A vector processor according to claim 1 wherein each tag information indicates an element number of a corresponding one of the fetched elements.

3. A vector processor according to claim 1 wherein said vector data is a portion of data in a relational data base, and said second means determines whether each fetched element satisfies a predetermined condition.

4. A vector processor according to claim 1 further comprising fifth means for fetching the second vector data from said memory and selectively fetching elements of a third vector data corresponding to the elements of the second vector data.

5. A vector processor comprising:
   a main memory storing a plurality of data vectors;
   a fetch circuit fetching an instruction from said main memory;
   a decoder decoding the instruction fetched from said main memory and producing a first output signal;
   a comparator, comparing in sequence one data element from a first data vector and one element from a second data vector and producing an output signal representative of the result of the comparison;
   an execution control circuit, responsive to the output signal of said comparator and the first output signal of the decoder, producing a plurality of control signals based on the signals received from the comparator and the decoder;
   a tag generator, responsive to one of the plurality of control signals, producing a separate tag for each data element of a data vector; and
   a tag writing circuit, responsive to one of said plurality of control signals, writing said separate tags corresponding to one data element of the first data vector and one data element of the second data vector into a third data vector based on the result of the comparison of the data element by the comparator.

6. A method of processing data vectors comprising the steps of:
   storing a plurality of data vectors;
   comparing data elements of two data vectors element by element;
   generating a tag for each data element of the two data vectors being compared; and
   storing, in a third data vector, tags of each pair of data elements compared whose comparison result in satisfying a predetermined condition.

7. The method of claim 6 wherein said predetermined condition is that the pair of data elements being compared, one from each data vector, are equal.

* * * * *

UNITED STATES PATENT AND TRADEMARK OFFICE
CERTIFICATE OF CORRECTION

PATENT NO. : 4,885,678
DATED : December 5, 1989
INVENTOR(S) : K. Kojima, et al.

It is certified that error appears in the above-identified patent and that said Letters Patent is hereby corrected as shown below:

Column 2, line 51, change "gain" to --again--.

Column 7, line 48, delete "is" between "instruction" and "under".

Column 9, line 4, change "which requires" to --which is required--.

Column 9, line 12, delete the comma after "memory".

Column 9, line 20, change "for" to --from--.

Column 10, line 37, change "result" to --results--.

Signed and Sealed this

Fifth Day of March, 1991

*Attest:*

HARRY F. MANBECK, JR.

*Attesting Officer*          *Commissioner of Patents and Trademarks*